United States Patent
Longman et al.

(10) Patent No.: US 11,402,487 B2
(45) Date of Patent: Aug. 2, 2022

(54) JOINT RADON TRANSFORM ASSOCIATION

(71) Applicant: GM GLOBAL TECHNOLOGY OPERATIONS LLC, Detroit, MI (US)

(72) Inventors: Oren Longman, Tel Aviv (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 737 days.

(21) Appl. No.: 16/388,596

(22) Filed: Apr. 18, 2019

(65) Prior Publication Data

US 2020/0333455 A1    Oct. 22, 2020

(51) Int. Cl.
| | |
|---|---|
| *G01S 13/66* | (2006.01) |
| *G06F 17/14* | (2006.01) |
| *G01S 13/931* | (2020.01) |
| *G01S 13/50* | (2006.01) |
| *G01S 17/66* | (2006.01) |
| *G01S 17/931* | (2020.01) |

(52) U.S. Cl.
CPC ............ *G01S 13/66* (2013.01); *G01S 13/505* (2013.01); *G01S 13/931* (2013.01); *G06F 17/14* (2013.01); *G01S 17/66* (2013.01); *G01S 17/931* (2020.01); *G01S 2013/9316* (2020.01); *G01S 2013/9322* (2020.01)

(58) Field of Classification Search
CPC .......... G01S 13/66; G01S 13/68; G01S 13/70; G01S 13/72; G01S 13/723; G01S 13/726; G01S 13/931; G01S 17/66; G01S 17/931
See application file for complete search history.

(56) References Cited

U.S. PATENT DOCUMENTS

| | | | | |
|---|---|---|---|---|
| 5,101,270 A | * | 3/1992 | Boone ................... | G06V 10/88 382/210 |
| 5,666,157 A | * | 9/1997 | Aviv ................ | G08B 13/19613 348/161 |
| 9,195,895 B1 | * | 11/2015 | Kapach ................ | G06K 9/6215 |
| 10,032,077 B1 | * | 7/2018 | Chow ....................... | G06T 7/60 |
| 10,467,474 B1 | * | 11/2019 | Malinas ................ | G06V 10/50 |
| 10,473,429 B1 | * | 11/2019 | Louchard ............. | G06K 9/6218 |
| 2015/0379361 A1 | * | 12/2015 | Boulanger ........... | H04N 5/2257 701/2 |
| 2015/0379714 A1 | * | 12/2015 | Cramer ................... | G01S 17/66 382/291 |
| 2016/0096270 A1 | * | 4/2016 | Ibarz Gabardos ....... | B25J 9/163 901/3 |
| 2016/0378117 A1 | * | 12/2016 | Szatmary ................ | G01S 17/89 382/153 |
| 2016/0379053 A1 | * | 12/2016 | Chen .................... | G06V 20/182 382/103 |
| 2017/0094527 A1 | * | 3/2017 | Shattil ................. | H04W 12/122 |

(Continued)

*Primary Examiner* — Peter M Bythrow
(74) *Attorney, Agent, or Firm* — Cantor Colburn LLP

(57) ABSTRACT

An example method for performing a joint radon transform association includes detecting, by a processing device, a target object to track relative to a vehicle. The method further includes performing, by the processing device, the joint radon transform association on the target object to generate association candidates. The method further includes tracking, by the processing device, the target object relative to the vehicle using the association candidates. The method further includes controlling, by the processing device, the vehicle based at least in part on tracking the target object.

17 Claims, 5 Drawing Sheets

(56) References Cited

U.S. PATENT DOCUMENTS

| | | | | |
|---|---|---|---|---|
| 2018/0322642 A1* | 11/2018 | Kolouri | .................. | G06V 20/41 |
| 2019/0114790 A1* | 4/2019 | Schallek | .............. | G06V 20/695 |
| 2019/0353767 A1* | 11/2019 | Eberspach | .............. | G01S 17/46 |
| 2020/0011995 A1* | 1/2020 | Send | ........................ | G01S 17/42 |
| 2020/0348385 A1* | 11/2020 | Schindler | ................ | G01S 3/784 |
| 2020/0371237 A1* | 11/2020 | Schindler | ................ | G01S 17/46 |

\* cited by examiner

JOINT RADON TRANSFORM ASSOCIATION

INTRODUCTION

The present disclosure relates to performing a joint radon transform association.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information from the vehicle to any other suitable entity. Various applications (e.g., V2X applications) can use V2X communications to send and/or receive safety messages, maintenance messages, vehicle status messages, and the like.

Modern vehicles can also include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with a radar device(s), LiDAR device(s), and/or the like for performing target tracking. Target tracking includes identifying a target object and tracking the target object over time as the target object moves with respect to the vehicle observing the target object. Images from the one or more cameras of the vehicle can also be used for performing target tracking.

SUMMARY

In one exemplary embodiment, a computer-implemented method for performing a joint radon transform association is provided. The method includes detecting, by a processing device, a target object to track relative to a vehicle. The method further includes performing, by the processing device, the joint radon transform association on the target object to generate association candidates. The method further includes tracking, by the processing device, the target object relative to the vehicle using the association candidates. The method further includes controlling, by the processing device, the vehicle based at least in part on tracking the target object.

In additional examples, the joint radon transform association is based at least in part on an energy score. In additional examples, performing the joint radon transform association comprises organizing a list of tracks and detections in association couples and, for each couple, constructing a joint signal defined by the following equation:

$$s[n, m] = \left[ s_1[n, m], \ s_2[n, m] e^{2\pi j \frac{2D_1}{\lambda} T} \right]$$

where s is an energy score of the association couple, $S_1$ is a signal of the track, $s_2$ is a signal of the detection, $\lambda$ is a signal wavelength, T is a time gap, n is a sample index, m is a chirp index, j is the complex coefficient for $\sqrt{-1}$, and $D_1$ is a track Doppler. In additional examples, preforming the joint radon transform association utilizes a joint radon transform defined by the following equation:

$$S = \sum_{k \in K} \left| \sum_{m=1}^{M} \sum_{n=1}^{N} s[n, m] e^{-2\pi j R(n,m,D_1)} e^{-2\pi j k \frac{n}{N}} e^{-2\pi j l \frac{m}{M}} \right|$$

where $e^{-2\pi j R(n,m,D_1)}$ determines a Radon sloped integration curve to be with $D_1$ slope:

$$R(n, m, D_1) = \left( mPRI \frac{2Sl}{c} D_1 \right)(nf_s)$$

where M is a number of chirps in a frame, N is a number of samples in each chirp, k is track range bins, l is a track Doppler bin, PRI is a pulse repetition interval, Sl is a chirp slope, c is the speed of light, and $f_s$ is a sampling frequency. In additional examples, the method further includes, prior to performing the joint radon transform association, performing an initial association on the target object to generate second association candidates. In additional examples, the method further includes, prior to performing the joint radon transform association, performing a statistical association on the target object to generate third association candidates. In additional examples, the joint radon transform association is performed responsive to determining that the third association candidates are below a certainty threshold.

In another exemplary embodiment a system includes a memory having computer readable instructions and a processing device for executing the computer readable instructions for performing a method for performing a joint radon transform association. The method includes detecting, by a processing device, a target object to track relative to a vehicle. The method further includes performing, by the processing device, the joint radon transform association on the target object to generate association candidates. The method further includes tracking, by the processing device, the target object relative to the vehicle using the association candidates. The method further includes controlling, by the processing device, the vehicle based at least in part on tracking the target object.

In additional examples, the joint radon transform association is based at least in part on an energy score. In additional examples, performing the joint radon transform association comprises organizing a list of tracks and detections in association couples and, for each couple, constructing a joint signal defined by the following equation:

$$s[n, m] = \left[ s_1[n, m], \ s_2[n, m] e^{2\pi j \frac{2D_1}{\lambda} T} \right]$$

where s is an energy score of the association couple, $s_1$ is a signal of the track, $s_2$ is a signal of the detection, $\lambda$ is a signal wavelength, T is a time gap, n is a sample index, m is a chirp index, j is the complex coefficient for $\sqrt{-1}$, and $D_1$ is a track Doppler. In additional examples, preforming the joint radon transform association utilizes a joint radon transform defined by the following equation:

$$S = \sum_{k \in K} \left| \sum_{m=1}^{M} \sum_{n=1}^{N} s[n,m] e^{-2\pi j R(n,m,D_1)} e^{-2\pi jk\frac{n}{N}} e^{-2\pi jl\frac{m}{M}} \right|$$

where $e^{-2\pi j R(n,m,D_1)}$ determines a Radon sloped integration curve to be with $D_1$ slope:

$$R(n,m,D_1) = \left( mPRI \frac{2Sl}{c} D_1 \right)(nf_s)$$

where M is a number of chirps in a frame, N is a number of samples in each chirp, k is track range bins, l is a track Doppler bin, PRI is a pulse repetition interval, Sl is a chirp slope, c is the speed of light, and $f_s$ is a sampling frequency. In additional examples, the method further includes, prior to performing the joint radon transform association, performing an initial association on the target object to generate second association candidates. In additional examples, the method further includes, prior to performing the joint radon transform association, performing a statistical association on the target object to generate third association candidates. In additional examples, the joint radon transform association is performed responsive to determining that the third association candidates are below a certainty threshold.

In yet another exemplary embodiment a computer program product includes a computer readable storage medium having program instructions embodied therewith, wherein the computer readable storage medium is not a transitory signal per se, the program instructions executable by a processing device to cause the processing device to perform a method for performing a joint radon transform association. The method includes detecting, by a processing device, a target object to track relative to a vehicle. The method further includes performing, by the processing device, the joint radon transform association on the target object to generate association candidates. The method further includes tracking, by the processing device, the target object relative to the vehicle using the association candidates. The method further includes controlling, by the processing device, the vehicle based at least in part on tracking the target object.

In additional examples, the joint radon transform association is based at least in part on an energy score. In additional examples, performing the joint radon transform association comprises organizing a list of tracks and detections in association couples and, for each couple, constructing a joint signal defined by the following equation:

$$s[n,m] = \left[ s_1[n,m], \; s_2[n,m] e^{2\pi j \frac{2D_1}{\lambda} T} \right]$$

where s is an energy score of the association couple, $s_1$ is a signal of the track, $s_2$ is a signal of the detection, $\lambda$ is a signal wavelength, T is a time gap, n is a sample index, m is a chirp index, j is the complex coefficient for $\sqrt{-1}$, and $D_1$ is a track Doppler. In additional examples, preforming the joint radon transform association utilizes a joint radon transform defined by the following equation:

$$S = \sum_{k \in K} \left| \sum_{m=1}^{M} \sum_{n=1}^{N} s[n,m] e^{-2\pi j R(n,m,D_1)} e^{-2\pi jk\frac{n}{N}} e^{-2\pi jl\frac{m}{M}} \right|$$

where $e^{-2\pi j R(n,m,D_1)}$ determines a Radon sloped integration curve to be with $D_1$ slope:

$$R(n,m,D_1) = \left( mPRI \frac{2Sl}{c} D_1 \right)(nf_s)$$

where M is a number of chirps in a frame, N is a number of samples in each chirp, k is track range bins, l is a track Doppler bin, PRI is a pulse repetition interval, $S_1$ is a chirp slope, c is the speed of light, and $f_s$ is a sampling frequency. In additional examples, the method further includes, prior to performing the joint radon transform association, performing an initial association on the target object to generate second association candidates. In additional examples, the method further includes, prior to performing the joint radon transform association, performing a statistical association on the target object to generate third association candidates, and the joint radon transform association is performed responsive to determining that the third association candidates are below a certainty threshold.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
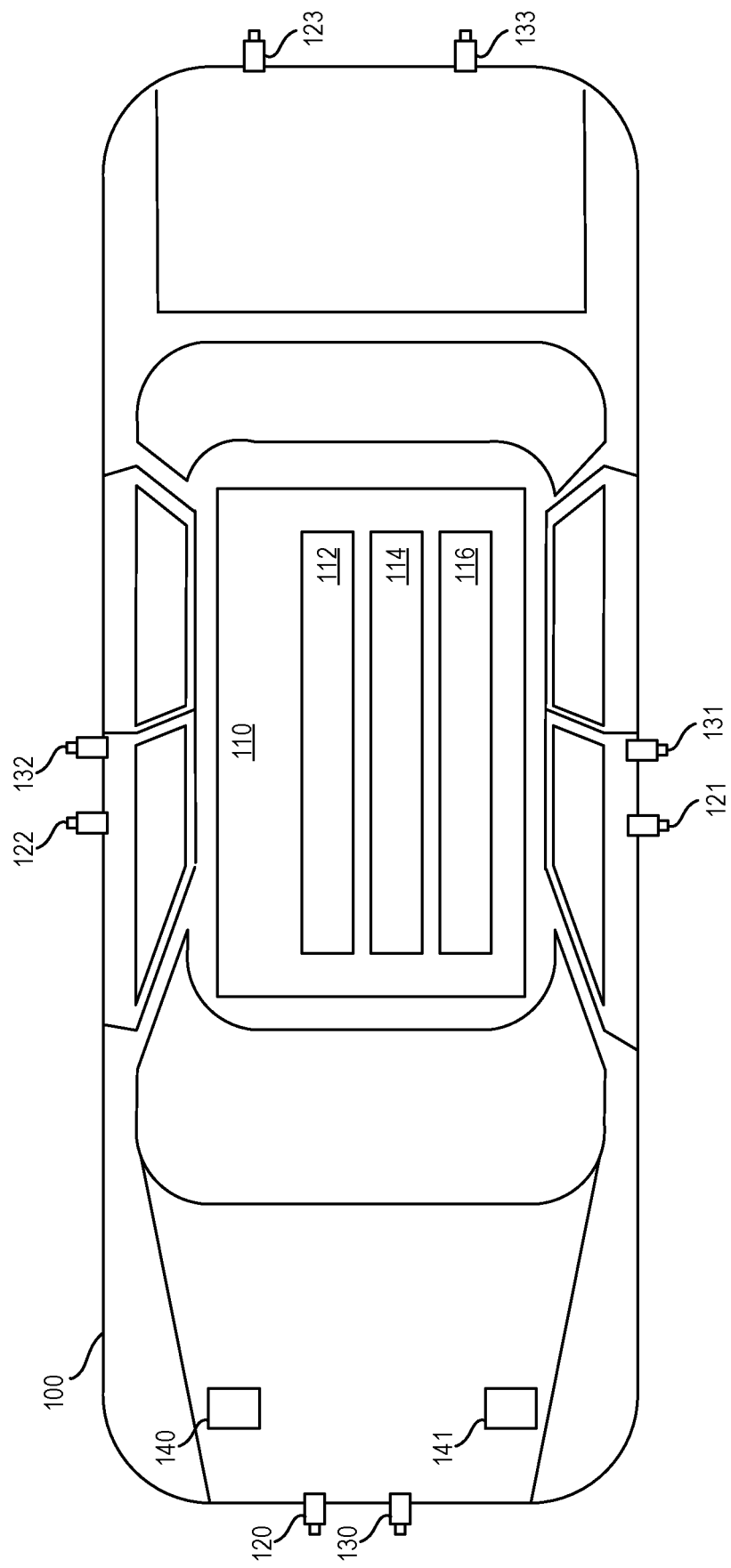
FIG. 1 depicts a vehicle including sensors and a processing system for performing a joint radon transform association according to one or more embodiments described herein.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for joint radon transform associations for object tracking. Radar-based object tracking utilizes target associations to associate a detected object and movement predictions (tracks) associated with the detected object. For example, Cartesian distances can be used to determine which candidate couples match. Such implementations are designed for sparse, point targets and do not operate as well in urban environments that include dense, extended objects.

In existing association processes, tracks of objects are predicted with respect to time. A Cartesian distance between the predictions and detections is calculated, and the Cartesian distances are then used in a many-to-many process as couples candidates scores.

The present techniques replace distance calculation based associations with joint radon transform associations. Joint radon transform associations use an energy score between candidates couples, and the many-to-many processes uses the energy score (instead of distance calculations) as the association criteria.

Accordingly, the presented techniques improve target tracking technologies by performing a joint radon transform association on a target object to generate association candidates. The target object is then tracked relative to the vehicle using the association candidates generated by the joint radon transform association, and the vehicle is controllable based on tracking the target object.

FIG. 1 depicts a vehicle 100 including sensors and a processing system 110 for performing a joint radon transform association according to one or more embodiments described herein. In the example of FIG. 1, the vehicle 100 includes the processing system 110, cameras 120, 121, 122, 123, cameras 130, 131, 132, 133, a radar sensor 140, and a LiDAR sensor 141. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). The cameras 130-133 are long-range cameras that capture images external to the vehicle and farther away from the vehicle 100 than the cameras 120-123. These images can be useful for object detection and avoidance, for example. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The radar sensor 140 measures range to a target object by transmitting electromagnetic waves and measuring the reflected waves with a sensor. This information is useful for determining a target object's distance/location relative to the vehicle 100.

The LiDAR (light detection and ranging) sensor 141 measures distance to a target object by illumining the target with pulsed laser light and measuring the reflected pulses with a sensor. This information is useful for determining a target object's distance/location relative to the vehicle 100.

Data generated from the cameras 120-123, 130-133, the radar sensor 140, and/or the LiDAR sensor 141 can be used to track a target object relative to the vehicle 100. Examples of target objects include other vehicles, pedestrians, bicycles, animals, and the like.

The processing system 110 includes a detection engine 112, an association engine 114, and a vehicle controlling engine 116. Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like. The features and functionality of the components of the processing system 110 are described further herein. The processing system 110 of the vehicle 100 performs a joint radon transform association for tracking a target object relative to a vehicle. This process is described further with reference to FIG. 2.

Figure 2:
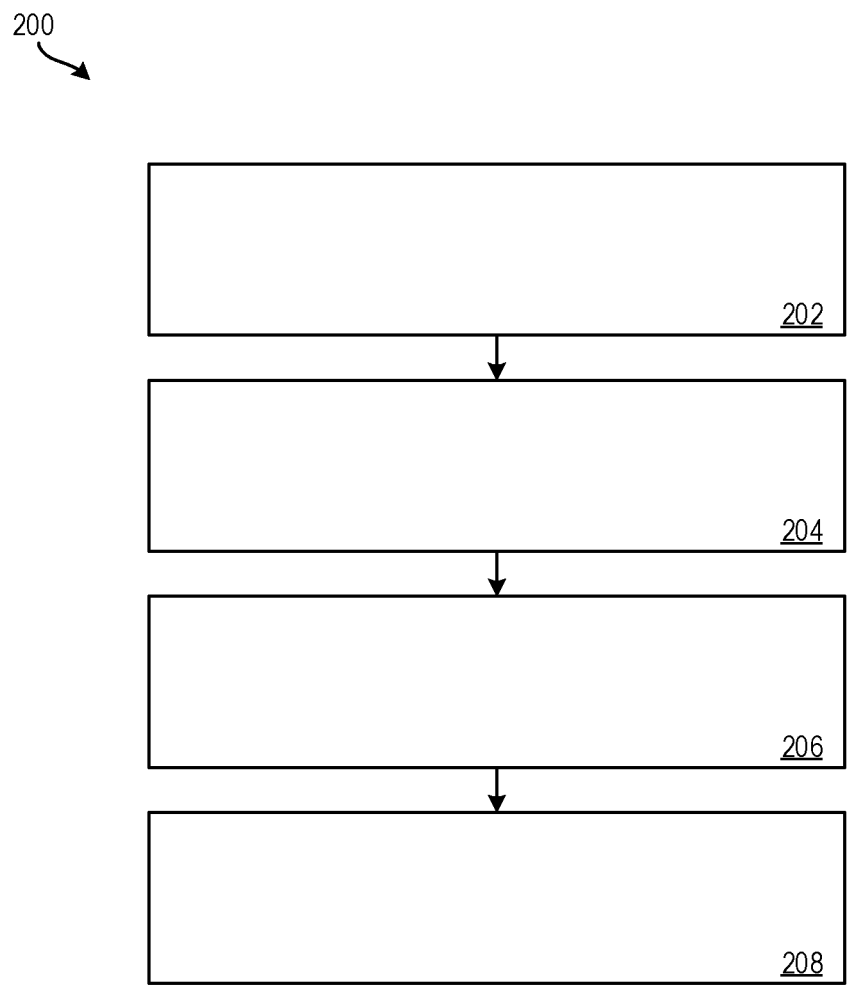
FIG. 2 depicts a flow diagram of a method for performing a joint radon transform association for tracking a target object relative to a vehicle according to one or more embodiments described herein.

In particular, FIG. 2 depicts a flow diagram of a method 200 for performing a joint radon transform association for tracking a target object relative to a vehicle according to one or more embodiments described herein. The method 200 can be performed by any suitable system or device such as the processing system 110 of FIG. 1, the processing system 500 of FIG. 5, or any other suitable processing system and/or processing device (e.g., a processor).

At block 202, the detection engine 112 detects a target object to track relative to a vehicle. In particular, the detection engine 112 generates a detection for the target object. The detection of the target object indicates the location where the target object is detected as traveling.

At block 204, the association and tracking engine 114 performs a joint radon transform association on the target object to generate association candidates. The association and tracking engine 114 receives a list of detections from the detection engine 112 and a list of tracks from the previous cycle, for various target objects. The association and tracking engine 114 organizes the tracks and detections in couples and, for each couple, constructs a joint signal from their individual signal defined by the following equation:

$$s[n, m] = \left[ s_1[n, m], s_2[n, m] e^{2\pi j \frac{2D_1}{\lambda} T} \right]$$

where s is an energy score of the association couple, $s_1$ is a signal of the track, $s_2$ is a signal of the detection, $\lambda$ is a signal wavelength, T is a time gap, n is a sample index, m is a chirp index, j is the complex coefficient for $\sqrt{-1}$, and $D_1$ is a track Doppler. The exponent which multiplies $s_2$ is a phrase correction component utilized due to the time gap between the previous frame and the current frame.

The joint radon transform is defined by the following equation:

$$S = \sum_{k \in K} \left| \sum_{m=1}^{M} \sum_{n=1}^{N} s[n, m] e^{-2\pi j R(n,m,D_1)} e^{-2\pi j k \frac{n}{N}} e^{-2\pi j l \frac{m}{M}} \right|$$

where $e^{-2\pi j R(n,m,D_1)}$ determines a Radon sloped integration curve to be with $D_1$ slope:

$$R(n, m, D_1) = \left( mPRI \frac{2Sl}{c} D_1 \right) (nf_s)$$

where M is a number of chirps in a frame, N is a number of samples in each chirp, k is track range bins, l is a track Doppler bin, PRI is a pulse repetition interval, Sl is a chirp slope, c is the speed of light, and $f_s$ is a sampling frequency.

At block 206, the association and tracking engine 114 tracks the target object relative to the vehicle using the association candidates. That is, over time, as the association and tracking engine 114 continues to determine the location of the target object relative to the vehicle.

At block 208, the control engine 116 controls the vehicle based at least in part on tracking the target object. Controlling the vehicle 100 can include increasing/decreasing speed, changing a direction, and the like. For example, if the position of the target object relative to the vehicle 100 would cause a collision, the control engine 116 can control the vehicle 100 to avoid the target object. This is possible due to tracking the target object using the joint radon transform association. Accordingly, vehicle technology is improved by controlling the vehicle using such position data.

Additional processes also may be included, and it should be understood that the process depicted in FIG. 2 represents an illustration and that other processes may be added or existing processes may be removed, modified, or rearranged without departing from the scope and spirit of the present disclosure.

Figure 3:
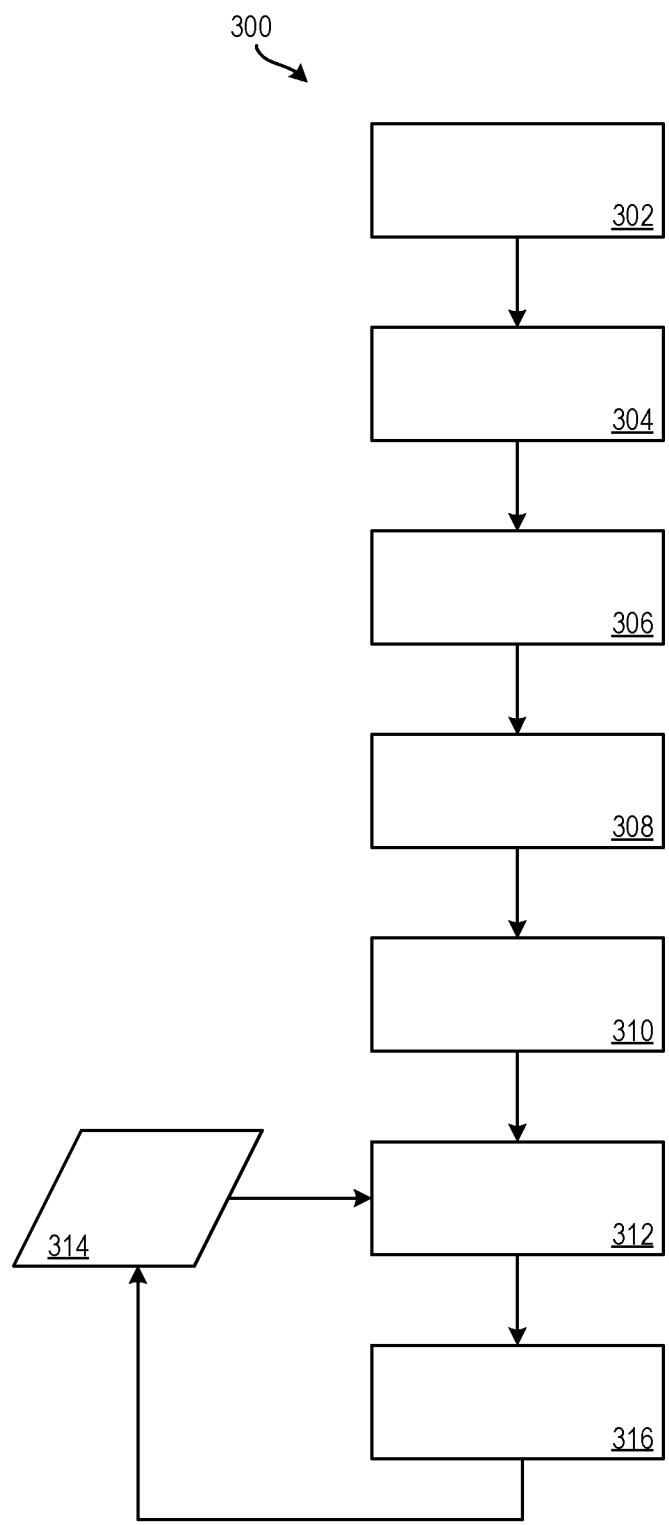
FIG. 3 depicts a flow diagram of a method for performing associations according to one or more embodiments described herein.

FIG. 3 depicts a flow diagram of a method 300 for performing associations according to one or more embodiments described herein. The method 300 can be performed by any suitable system or device such as the processing system 110 of FIG. 1, the processing system 500 of FIG. 5, or any other suitable processing system and/or processing device (e.g., a processor).

At block 302, the processing system 110 receives a signal from the radar sensor 140 and performs analog to digital conversion to convert the signal from an analog signal to a digital signal as samples.

At block 304, the processing system 110 receives the samples and performs a range fast Fourier transform on the samples to generate a range-chirp-channel map.

At block 306, the processing system 110 performs a Doppler fast Fourier transform on the range-chirp-channel map to generate a range-Doppler-channel map.

At block 308, the processing system 110 performs digital beamforming on the range-Doppler-channel map to generate a range-Doppler-beam map.

At block 310, the processing system 110 generates detections in the form of detections from the range-Doppler-beam map.

At block 312, the processing system 110 performs associations, such as using the association and tracking engine 114, based at least in part on data stored in a tracks database 314 and the detections. The tracks database stores tracks information. The associations can include an initial association, a statistical association, and/or a joint Radon transform association. These associations are further described in FIG. 4.

With continued reference to FIG. 3, at block 316, the processing system then tracks, using the association and tracking engine 114, the target object using the results of the association(s) performed at block 312. The tracking results can be stored as tracks to the tracks database 314.

Additional processes also may be included, and it should be understood that the process depicted in FIG. 3 represents an illustration and that other processes may be added or existing processes may be removed, modified, or rearranged without departing from the scope and spirit of the present disclosure.

Figure 4:
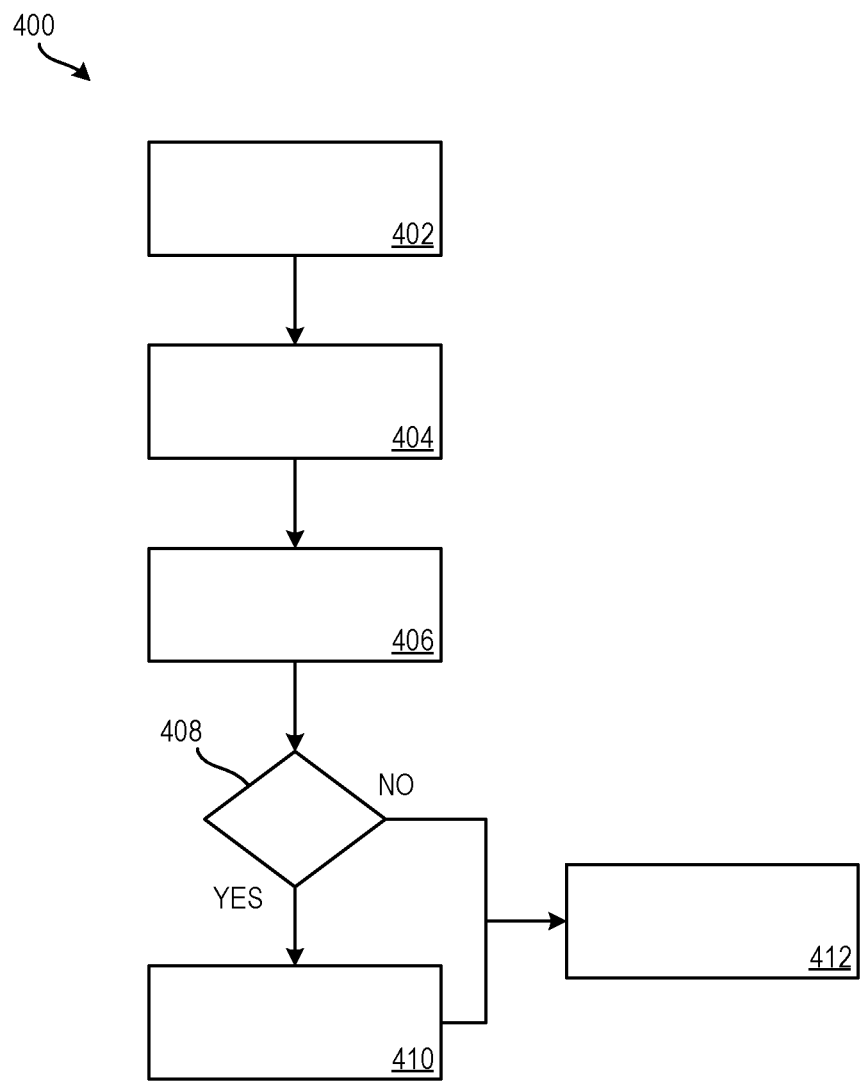
FIG. 4 depicts a flow diagram of a method for performing associations according to one or more embodiments described herein.

FIG. 4 depicts a flow diagram of a method 400 for performing associations according to one or more embodiments described herein. The method 200 can be performed by any suitable system or device such as the processing system 110 of FIG. 1, the processing system 500 of FIG. 5, or any other suitable processing system and/or processing device (e.g., a processor).

Performing a joint radon transform association is computationally intensive and complex. Accordingly, it is beneficial to use joint radon transform associations in combination with other types of associations. For example, an efficient implementation of joint radon transform association is to incorporate it with other association schemes. As one such example, an association candidate undergoes an initial association and a statistical association. Then, targets of low statistical association certainty undergo joint radon transform association. This approach reduces the number of association candidates that undergo joint radon transform association, thereby reducing the high computational load associated with performing joint radon transform association while still enabling joint radon transform association to be performed on appropriate candidates. FIG. 4 depicts an example for implementing such associations.

At block 402, the association and tracking engine 114 receives association candidates for performing an association as part of a target object tracking process.

At block 404, the association and tracking engine 114 performs an initial association. For each target (i.e., association candidate), an association window is created based on the location of the target, kinematics, and a time difference between a past target update time for the target and a current detection time for the target.

At block 406, the association and tracking engine 114 performs a statistical association. A target state is predicted to the detection time. Statistical distance is calculated between the predicted target state and a detected target state. If a track has a statistical distance below a certainty threshold with more than one detection, these association candidates are deemed to be with low certainty. That is, if the track has only one or zero candidate detections with statistical distance below a certainty threshold at block 408, the association is considered valid at block 412.

If the association candidates have low certainty at block 408, the method proceeds to block 410, where the association and tracking engine 114 performs a joint radon transformation association. If a detection is associated to more than one track, and the difference between the different candidates' statistical distance is below the certainty threshold at block 408, the joint radon transformation associate is performed. Results of the joint radon association at block 410 are considered to be a valid association at block 412.

Additional processes also may be included, and it should be understood that the process depicted in FIG. 4 represents an illustration and that other processes may be added or existing processes may be removed, modified, or rearranged without departing from the scope and spirit of the present disclosure.

Figure 5:
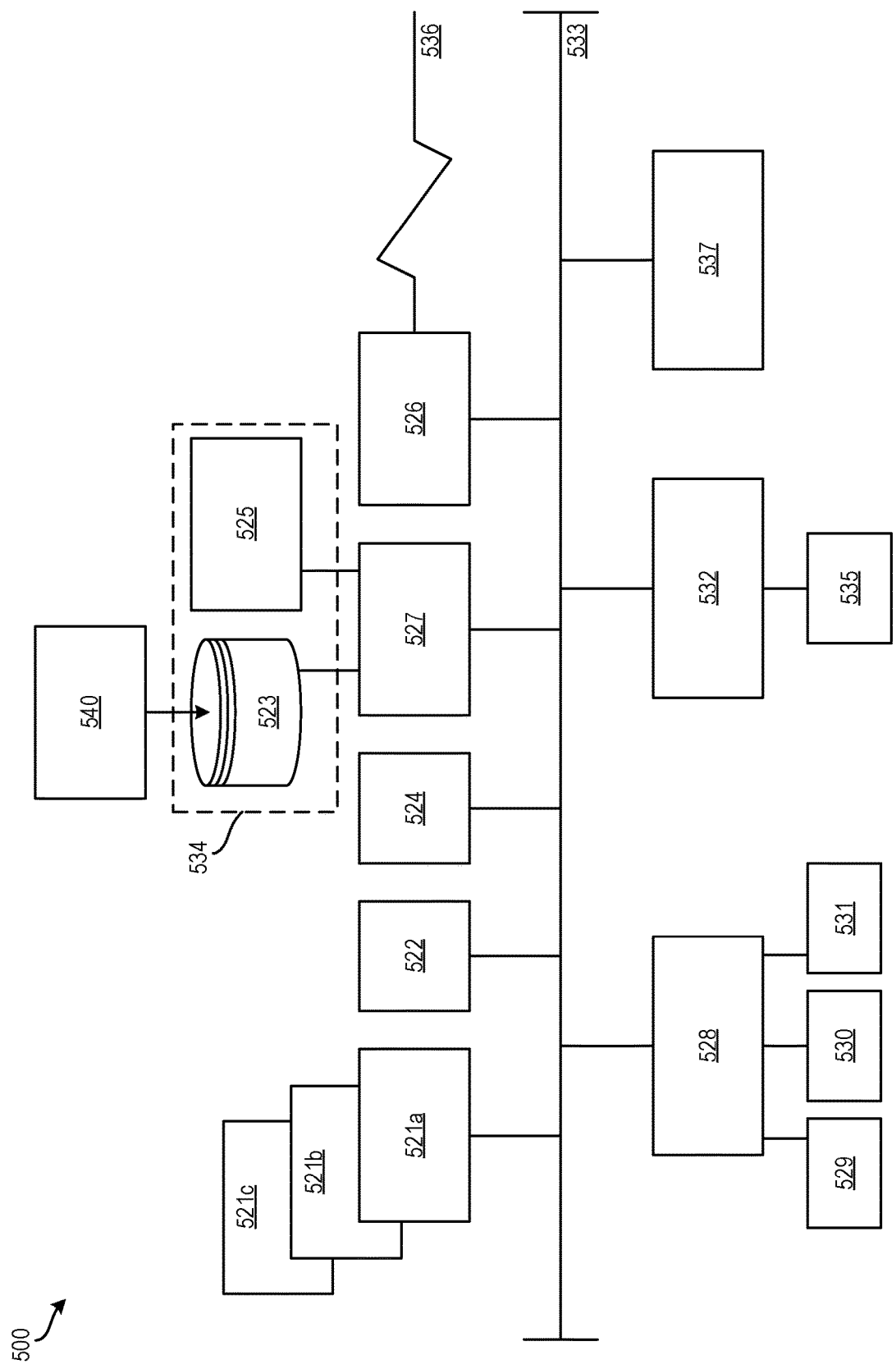
FIG. 5 depicts a block diagram of a processing system for implementing the techniques described herein according to an exemplary embodiment.

It is understood that the present disclosure is capable of being implemented in conjunction with any other type of computing environment now known or later developed. For example, FIG. 5 depicts a block diagram of a processing system 500 for implementing the techniques described herein. In examples, processing system 500 has one or more central processing units (processors) 521a, 521b, 521c, etc. (collectively or generically referred to as processor(s) 521 and/or as processing device(s)). In aspects of the present disclosure, each processor 521 can include a reduced instruction set computer (RISC) microprocessor. Processors 521 are coupled to system memory (e.g., random access memory (RAM) 524) and various other components via a system bus 533. Read only memory (ROM) 522 is coupled to system bus 533 and may include a basic input/output system (BIOS), which controls certain basic functions of processing system 500.

Further depicted are an input/output (I/O) adapter 527 and a network adapter 526 coupled to system bus 533. I/O adapter 527 may be a small computer system interface (SCSI) adapter that communicates with a hard disk 523 and/or a storage device 525 or any other similar component. I/O adapter 527, hard disk 523, and storage device 525 are collectively referred to herein as mass storage 534. Operating system 540 for execution on processing system 500 may be stored in mass storage 534. The network adapter 526 interconnects system bus 533 with an outside network 536 enabling processing system 500 to communicate with other such systems.

A display (e.g., a display monitor) 535 is connected to system bus 533 by display adapter 532, which may include a graphics adapter to improve the performance of graphics intensive applications and a video controller. In one aspect of the present disclosure, adapters 526, 527, and/or 532 may be connected to one or more I/O busses that are connected to system bus 533 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 533 via user interface adapter 528 and display adapter 532. A keyboard 529, mouse 530, and speaker 531 may be interconnected to system bus 533 via user interface adapter 528, which may include, for example, a Super I/O chip integrating multiple device adapters into a single integrated circuit. One or more of the cameras 120-123, 130-133 are also connected to the system bus 533.

In some aspects of the present disclosure, processing system 500 includes a graphics processing unit 537. Graphics processing unit 537 is a specialized electronic circuit designed to manipulate and alter memory to accelerate the creation of images in a frame buffer intended for output to a display. In general, graphics processing unit 537 is very efficient at manipulating computer graphics and image processing, and has a highly parallel structure that makes it more effective than general-purpose CPUs for algorithms where processing of large blocks of data is done in parallel.

Thus, as configured herein, processing system 500 includes processing capability in the form of processors 521, storage capability including system memory (e.g., RAM 524), and mass storage 534, input means such as keyboard 529 and mouse 530, and output capability including speaker 531 and display 535. In some aspects of the present disclosure, a portion of system memory (e.g., RAM 524) and mass storage 534 collectively store the operating system 540 to coordinate the functions of the various components shown in processing system 500.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for performing a joint radon transform association, the method comprising:
   detecting, by a processing device, a target object to track relative to a vehicle;
   performing, by the processing device, the joint radon transform association on the target object to generate association candidates, wherein the joint radon transform association is based at least in part on an energy score;
   tracking, by the processing device, the target object relative to the vehicle using the association candidates; and
   controlling, by the processing device, the vehicle based at least in part on tracking the target object.

2. The computer-implemented method of claim 1, wherein performing the joint radon transform association comprises organizing a list of tracks and detections in association couples and, for each couple, constructing a joint signal defined by the following equation:

$$s[n,m] = \left[s_1[n,m], s_2[n,m]e^{2\pi j \frac{2D_1}{\lambda}T}\right]$$

where s is an energy score of the association couple, $s_1$ is a signal of the track, $s_2$ is a signal of the detection, $\lambda$ is a signal wavelength, T is a time gap, n is a sample index, m is a chirp index, j is the complex coefficient for $\sqrt{-1}$, and $D_1$ is a track Doppler.

3. The computer-implemented method of claim 2, wherein preforming the joint radon transform association utilizes a joint radon transform defined by the following equation:

$$S = \sum_{k \in K} \left| \sum_{m=1}^{M} \sum_{n=1}^{N} s[n,m] e^{-2\pi j R(n,m,D_1)} e^{-2\pi j k \frac{n}{N}} e^{-2\pi j l \frac{m}{M}} \right|$$

where $e^{-2\pi j R(n,m,D_1)}$ determines a Radon sloped integration curve to be with $D_1$ slope:

$$R(n, m, D_1) = \left(mPRI\frac{2Sl}{c}D_1\right)(nf_s)$$

where M is a number of chirps in a frame, N is a number of samples in each chirp, k is track range bins, l is a track Doppler bin, PRI is a pulse repetition interval, Sl is a chirp slope, c is the speed of light, and $f_s$ is a sampling frequency.

4. The computer-implemented method of claim 1, further comprising, prior to performing the joint radon transform association, performing an initial association on the target object to generate second association candidates.

5. The computer-implemented method of claim 1, further comprising, prior to performing the joint radon transform association, performing a statistical association on the target object to generate third association candidates.

6. The computer-implemented method of claim 5, wherein the joint radon transform association is performed responsive to determining that the third association candidates are below a certainty threshold.

7. A system comprising:
a memory comprising computer readable instructions; and
a processing device for executing the computer readable instructions for performing a method for performing a joint radon transform association, the method comprising:
detecting, by the processing device, a target object to track relative to a vehicle;
performing, by the processing device, the joint radon transform association on the target object to generate association candidates, wherein the joint radon transform association is based at least in part on an energy score;
tracking, by the processing device, the target object relative to the vehicle using the association candidates; and
controlling, by the processing device, the vehicle based at least in part on tracking the target object.

8. The system of claim 7, wherein performing the joint radon transform association comprises organizing a list of tracks and detections in association couples and, for each couple, constructing a joint signal defined by the following equation:

$$s[n, m] = \left[s_1[n, m], s_2[n, m]e^{2\pi j \frac{2D_1}{\lambda}T}\right]$$

where s is an energy score of the association couple, $s_1$ is a signal of the track, $s_2$ is a signal of the detection, $\lambda$ is a signal wavelength, T is a time gap, n is a sample index, m is a chirp index, j is the complex coefficient for $\sqrt{-1}$, and $D_1$ is a track Doppler.

9. The system of claim 8, wherein preforming the joint radon transform association utilizes a joint radon transform defined by the following equation:

$$S = \sum_{k \in K} \left| \sum_{m=1}^{M} \sum_{n=1}^{N} s[n, m] e^{-2\pi j R(n,m,D_1)} e^{-2\pi jk\frac{n}{N}} e^{-2\pi jl\frac{m}{M}} \right|$$

where $e^{-2\pi j R(n,m,D_1)}$ determines a Radon sloped integration curve to be with $D_1$ slope:

$$R(n, m, D_1) = \left(mPRI\frac{2Sl}{c}D_1\right)(nf_s)$$

where M is a number of chirps in a frame, N is a number of samples in each chirp, k is track range bins, l is a track Doppler bin, PRI is a pulse repetition interval, Sl is a chirp slope, c is the speed of light, and $f_s$ is a sampling frequency.

10. The system of claim 7, wherein the method further comprises, prior to performing the joint radon transform association, performing an initial association on the target object to generate second association candidates.

11. The system of claim 7, wherein the method further comprises, prior to performing the joint radon transform association, performing a statistical association on the target object to generate third association candidates.

12. The system of claim 11, wherein the joint radon transform association is performed responsive to determining that the third association candidates are below a certainty threshold.

13. A computer program product comprising:
a non-transitory computer readable storage medium having program instructions embodied therewith, the program instructions executable by a processing device to cause the processing device to perform a method for performing a joint radon transform association, the method comprising:
detecting, by the processing device, a target object to track relative to a vehicle;
performing, by the processing device, the joint radon transform association on the target object to generate association candidates, wherein the joint radon transform association is based at least in part on an energy score;
tracking, by the processing device, the target object relative to the vehicle using the association candidates; and
controlling, by the processing device, the vehicle based at least in part on tracking the target object.

14. The computer program product of claim 13, wherein performing the joint radon transform association comprises organizing a list of tracks and detections in association couples and, for each couple, constructing a joint signal defined by the following equation:

$$s[n, m] = \left[s_1[n, m], s_2[n, m]e^{2\pi j \frac{2D_1}{\lambda}T}\right]$$

where s is an energy score of the association couple, $s_1$ is a signal of the track, $s_2$ is a signal of the detection, $\lambda$ is a signal wavelength, T is a time gap, n is a sample index, m is a chirp index, j is the complex coefficient for $\sqrt{-1}$, and $D_1$ is a track Doppler.

15. The computer program product of claim 14, wherein preforming the joint radon transform association utilizes a joint radon transform defined by the following equation:

$$S = \sum_{k \in K} \left| \sum_{m=1}^{M} \sum_{n=1}^{N} s[n, m] e^{-2\pi j R(n,m,D_1)} e^{-2\pi jk\frac{n}{N}} e^{-2\pi jl\frac{m}{M}} \right|$$

where $e^{-2\pi j R(n,m,D_1)}$ determines a Radon sloped integration curve to be with $D_1$ slope:

$$R(n, m, D_1) = \left(mPRI\frac{2Sl}{c}D_1\right)(nf_s)$$

where M is a number of chirps in a frame, N is a number of samples in each chirp, k is track range bins, l is a track Doppler bin, PRI is a pulse repetition interval, Sl is a chirp slope, c is the speed of light, and $f_s$ is a sampling frequency.

16. The computer program product of claim 13, wherein the method further comprises, prior to performing the joint radon transform association, performing an initial association on the target object to generate second association candidates.

17. The computer program product of claim 13, wherein the method further comprises, prior to performing the joint radon transform association, performing a statistical association on the target object to generate third association candidates, and wherein the joint radon transform association is performed responsive to determining that the third association candidates are below a certainty threshold.

* * * * *